(12) United States Patent
Boross et al.

(10) Patent No.: US 9,013,552 B2
(45) Date of Patent: Apr. 21, 2015

(54) METHOD AND SYSTEM FOR UTILIZING IMAGE SENSOR PIPELINE (ISP) FOR SCALING 3D IMAGES BASED ON Z-DEPTH INFORMATION

(75) Inventors: Chris Boross, Sunnyvale, CA (US); Nambirajan Seshadri, Irvine, CA (US); Jeyhan Karaoguz, Irvine, CA (US); Xuemin Chen, Rancho Santa Fe, CA (US)

(73) Assignee: Broadcom Corporation, Irvine, CA (US)

( * ) Notice: Subject to any disclaimer, the term of this patent is extended or adjusted under 35 U.S.C. 154(b) by 434 days.

(21) Appl. No.: 13/174,261

(22) Filed: Jun. 30, 2011

(65) Prior Publication Data
US 2012/0050482 A1 Mar. 1, 2012

Related U.S. Application Data

(60) Provisional application No. 61/377,867, filed on Aug. 27, 2010.

(51) Int. Cl.
*H04N 13/02* (2006.01)
*H04N 13/00* (2006.01)

(52) U.S. Cl.
CPC ......... *H04N 13/025* (2013.01); *H04N 13/0018* (2013.01); *H04N 13/026* (2013.01); *H04N 13/0271* (2013.01)

(58) Field of Classification Search
CPC ... H04N 13/02; H04N 13/00; H04N 13/0018; H04N 13/0271; H04N 13/026; H04N 13/025; H04N 13/0221; H04N 13/0275; H04N 13/0051
USPC .......................................................... 348/46
See application file for complete search history.

(56) References Cited

U.S. PATENT DOCUMENTS

| | | | | |
|---|---|---|---|---|
| 6,414,709 B1* | 7/2002 | Palm et al. | ...................... | 348/47 |
| 2008/0150945 A1* | 6/2008 | Wang et al. | ................... | 345/427 |
| 2008/0309660 A1* | 12/2008 | Bertolami et al. | ............ | 345/419 |
| 2009/0201384 A1* | 8/2009 | Kang et al. | ................. | 348/222.1 |
| 2011/0273594 A1* | 11/2011 | Zhao et al. | ................. | 348/240.2 |

OTHER PUBLICATIONS

Pourazad et al., Generating the Depth Map from the Motion Information of H.264-Encoded 2D Video Sequence, EURASIP Journal on Image and Video Processing, vol. 10, Article ID 108584.*

* cited by examiner

*Primary Examiner* — Young Lee
*Assistant Examiner* — Francis G Geroleo
(74) *Attorney, Agent, or Firm* — Brinks Gilson & Lione (57) ABSTRACT

A monoscopic video camera may capture, via at least one image sensor, two-dimensional video, and may capture, via at least one depth sensor, corresponding depth information for the captured two-dimensional video. The monoscopic video camera may then adaptively configure scaling operations applicable to the captured two-dimensional video based on the depth information, which may comprise variably scaling different portions of the two-dimensional video. In this regard, the monoscopic video camera may determine, based on the depth information, a plurality of depth planes. The different portions of the two-dimensional video that are subjected to variable scaling may be determined based on the plurality of depth planes. Configuration of scaling operations may be performed in response to user input, which may comprise a zoom command. In this regard, scaling operations may be configured to focus on one or more of the different portions of the two-dimensional video based on zoom commands.

15 Claims, 6 Drawing Sheets

METHOD AND SYSTEM FOR UTILIZING IMAGE SENSOR PIPELINE (ISP) FOR SCALING 3D IMAGES BASED ON Z-DEPTH INFORMATION

CLAIM OF PRIORITY

This patent application makes reference to, claims priority to and claims benefit from U.S. Provisional Application Ser. No. 61/377,867, which was filed on Aug. 27, 2010.

The above stated application is hereby incorporated herein by reference in its entirety.

CROSS-REFERENCE TO RELATED APPLICATIONS/INCORPORATION BY REFERENCE

This application also makes reference to:

U.S. application Ser. No. 13/077,900 filed on Mar. 31, 2011;
U.S. application Ser. No. 13/077,912 filed on Mar. 31, 2011;
U.S. application Ser. No. 13/077,922 filed on Mar. 31, 2011;
U.S. application Ser. No. 13/077,886 filed on Mar. 31, 2011;
U.S. application Ser. No. 13/077,926 filed on Mar. 31, 2011;
U.S. application Ser. No. 13/077,893 filed on Mar. 31, 2011;
U.S. application Ser. No. 13/077,923 filed on Mar. 31, 2011;
U.S. application Ser. No. 13/174,364 filed on Jun. 30, 2011;
U.S. application Ser. No. 13/174,430 filed on Jun. 30, 2011;
U.S. Provisional Application Ser. No. 61/439,201 filed on Feb. 3, 2011;
U.S. application Ser. No. 13/174,344 filed on Jun. 30, 2011;
U.S. Provisional Application Ser. No. 61/439,209 filed on Feb. 3, 2011;
U.S. application Ser. No. 13/174,370 filed on Jun. 30, 2011;
U.S. application Ser. No. 13/077,868 filed on Mar. 31, 2011;
U.S. application Ser. No. 13/077,880 filed on Mar. 31, 2011;
U.S. application Ser. No. 13/077,899 filed on Mar. 31, 2011; and
U.S. application Ser. No. 13/077,930 filed on Mar. 31, 2011.

Each of the above stated applications is hereby incorporated herein by reference in its entirety.

FEDERALLY SPONSORED RESEARCH OR DEVELOPMENT

[Not Applicable].

MICROFICHE/COPYRIGHT REFERENCE

[Not Applicable].

FIELD OF THE INVENTION

Certain embodiments of the invention relate to video processing. More specifically, certain embodiments of the invention relate to a method and system for utilizing image sensor pipeline (ISP) for scaling 3D images based on z-depth information.

BACKGROUND OF THE INVENTION

Support and demand for video systems that support three-dimensional (3D) video has increased rapidly in recent years. Both literally and physically, 3D video provides a whole new way to watch video, in home and in theaters. However, 3D video systems are still in their infancy in many ways and there is much room for improvement in terms of both cost and performance.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for utilizing image sensor pipeline (ISP) for scaling 3D images based on z-depth information, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for utilizing image sensor pipeline (ISP) for scaling 3D images based on z-depth information. In various embodiments of the invention, a monoscopic video camera may be utilized to adaptively configure scaling of three-dimensional video captured and/or generated via the monoscopic video camera. In this regard, the monoscopic video camera may capture, via at least one image sensor, two-dimensional video, and may capture, via at least one depth sensor, corresponding depth information for the captured two-dimensional video. The adaptive configuration of scaling may comprise variably scaling different portions of the two-dimensional video. In this regard, the monoscopic video camera may determine, based on the captured depth information, a plurality of depth planes associated with the captured two-dimensional video. The different portions of the two-dimensional video, which may be subjected to variable scaling, may be determined based on association with the determined plurality of depth planes. Configuration of scaling operations may be performed in response to user input, which may comprise zoom commands. In this regard, scaling operations may be configured to focus on one or more of the different portions of the two-dimensional video, and/or one or more of the determined plurality of depth planes, based on zoom commands.

The monoscopic video camera may be operable to synchronize the captured corresponding depth information to the captured two-dimensional video, to enable generating three-dimensional perception for at least some images captured via the monoscopic video camera. Accordingly, the monoscopic video camera may compose three-dimensional video from captured two-dimensional video based on corresponding captured depth information. The monoscopic video camera may then render the composed three-dimensional video, autonomously—using integrated display in the monoscopic video camera, or via another display device, to which the three-dimensional video may be communicated directly from the monoscopic video camera or indirectly via intermediate storage devices.

Figure 1:
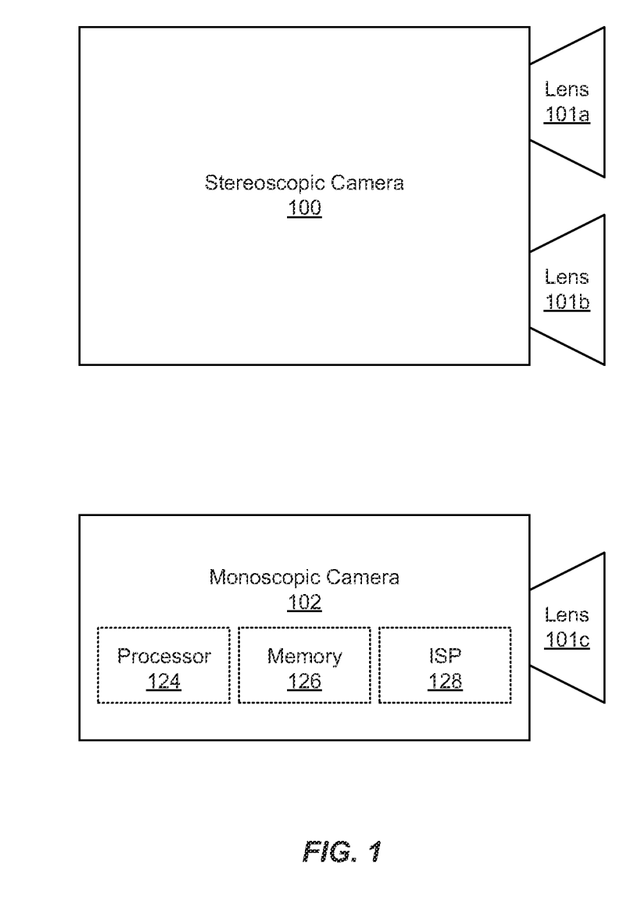
FIG. 1 is a diagram that illustrates an exemplary monoscopic, or single-view, camera embodying aspects of the present invention, compared with a conventional stereoscopic camera.

FIG. 1 is a diagram that compares a monoscopic camera embodying aspects of the present invention with a conventional stereoscopic camera. Referring to FIG. 1, there is shown a stereoscopic camera 100 and a monoscopic camera 102.

The stereoscopic camera 100 may comprise suitable logic, circuitry, interfaces, and/or code that may enable capturing and/or generating stereoscopic video and/or images. In this regard, the stereoscopic camera 100 may comprise two lenses 101a and 101b. Each of the lenses 101a and 101b may capture images from a different viewpoint and images captured via the two lenses 101a and 101b may be combined to generate a 3D image. In this regard, electromagnetic (EM) waves in the visible spectrum may be focused on a first one or more image sensors by the lens 101a (and associated optics) and EM waves in the visible spectrum may be focused on a second one or more image sensors by the lens (and associated optics) 101b.

The monoscopic camera 102 may comprise suitable logic, circuitry, interfaces, and/or code that may enable capturing and/or generating monoscopic video and/or images. In this regard, the monoscopic camera 102 may capture images via a single viewpoint, corresponding to the lens 101c for example. EM waves in the visible spectrum may be focused on one or more image sensors by the lens 101c. The image sensor(s) may capture brightness and/or color information. The captured brightness and/or color information may be represented in any suitable color space such as YCrCb color space or RGB color space. In an exemplary aspect of the invention, the monoscopic camera 102 may be operable to generate 3D video and/or images based on captured 2D video and/or images based on, for example, depth information. In this regard, the monoscopic camera 102 may also capture depth information via the lens 101c (and associated optics). For example, the monoscopic camera 102 may comprise an infrared emitter, an infrared sensor, and associated circuitry operable to determine the distance to objects based on reflected infrared waves. Additional details of the monoscopic camera 102 are described below.

The monoscopic camera may comprise a processor 124, a memory 126, and a sensory subsystem 128. The processor 124 may comprise suitable logic, circuitry, interfaces, and/or code that may be operable to manage operation of various components of the camera and perform various computing and processing tasks. A single processor 124 is utilized only for illustration but the invention is not so limited. In an exemplary embodiment of the invention, various portions of the camera 102 depicted in FIG. 2A below may correspond to the processor 124 depicted in FIG. 1. The memory 106 may comprise, for example, DRAM, SRAM, flash memory, a hard drive or other magnetic storage, or any other suitable memory devices.

The sensory subsystem 128 may comprise a plurality of sensors which may be operable to capture and/or generate video information corresponding to images and/or video streams generated via the monoscopic camera 102. The sensory subsystem 128 may also comprise suitable logic, circuitry, interfaces, and/or code that may be operable to manage and/or control of the various sensors in the sensory subsystem 128, and/or to handling at the least some of the processing of information generated and/or captured thereby. In this regard, the sensory subsystem 128 may enable generating 2D video and corresponding depth and/or color information. The sensory subsystem 128 may comprise, for example, one or more image sensors, one or more depth sensors, and one or more sensors. In this regard, exemplary sensors that may be integrated into the sensory subsystem 128 are described in more detail below with respect to FIG. 2A.

In various embodiments of the invention, the monoscopic camera 102 may be operable to utilize depth information to control and/or configure scaling of 3D video and/or images generated based on captured 2D video and/or images. In this regard, scaling may be applied adaptively and/or variably to different portions and/or regions of 3D video and/or images based on depth information corresponding to captured and/or generated 2D video or images that are utilized in generating the 3D video and/or images. For example, the monoscopic camera 102 may determine based on the captured depth information, a plurality of depth planes associated with the captured 2D video or images. Scaling operations may then be configured adaptively, such that portions of the 2D video or images may be subjected to variable scaling based on association with each of the plurality of depth planes.

Figure 2A:
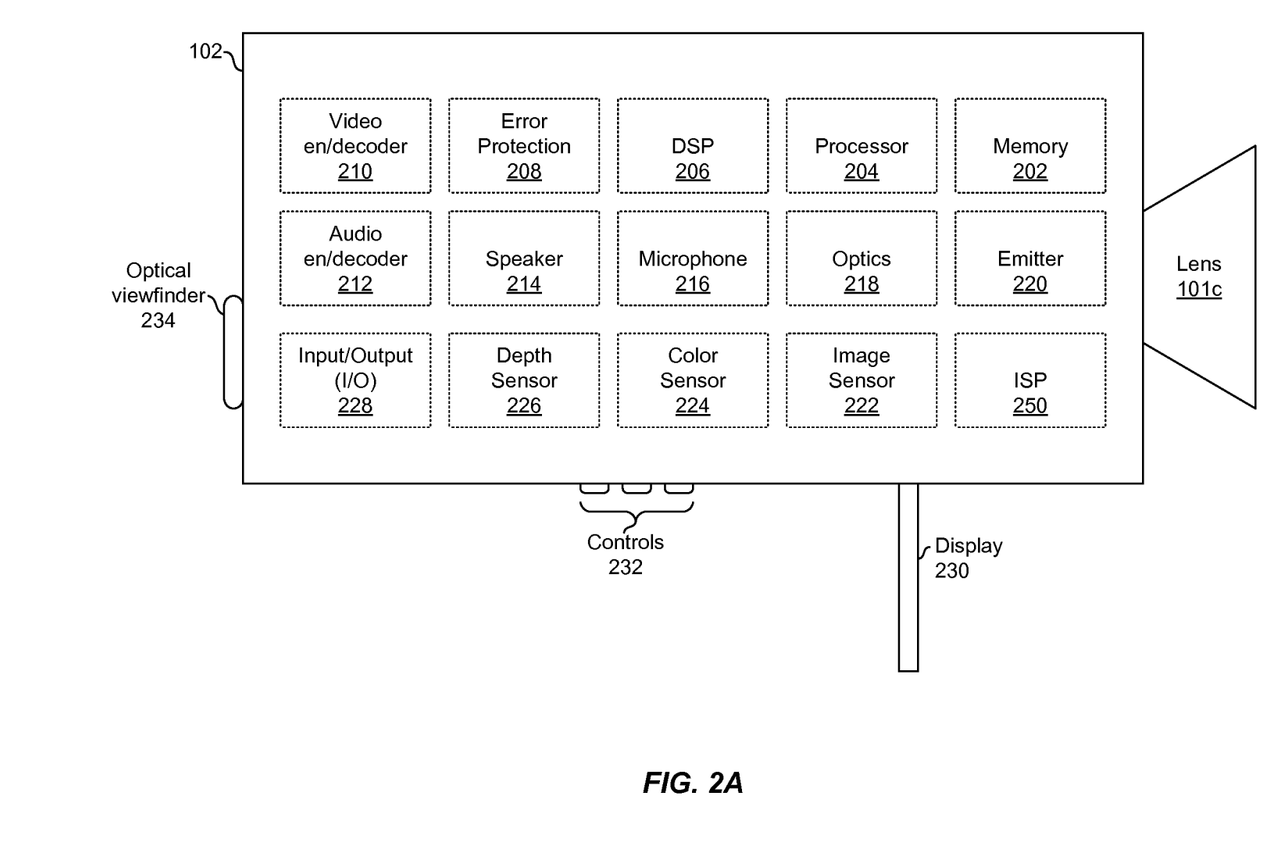
FIG. 2A is a diagram illustrating an exemplary monoscopic camera, which may be utilized in accordance with an embodiment of the invention.

FIG. 2A is a diagram illustrating an exemplary monoscopic camera, in accordance with an embodiment of the invention. Referring to FIG. 2A, there is shown the monoscopic camera 102, which may comprise a memory 202, a processor 204, a digital signal processor (DSP) 206, an error protection module 208, a video encoder/decoder 210, an audio encoder/decoder 212, a speaker 214, a microphone 216, an optics module 218, an emitter 220, an input/output (I/O) module 228, a digital display 230, controls 232, and optical viewfinder 234. The camera 102 may also comprise a plurality of sensors which may be operable to capture and/or generate video information corresponding to images and/or video streams. The camera 102 may comprise, for example, one or more image sensors 222, one or more color sensor 224, and one or more depth sensor 226. The camera 102 may also comprise the lens 101c, which may be operable to collect and sufficiently focus electromagnetic waves in the visible and infrared spectra to enable capturing images and/or video.

The memory 202 may comprise suitable logic, circuitry, interfaces, and/or code that may enable temporary and/or permanent storage of data, and/or retrieval or fetching thereof. The memory 202 may comprise, for example, DRAM, SRAM, flash memory, a hard drive or other magnetic storage, or any other suitable memory devices. For example, SRAM may be utilized to store data utilized and/or generated by the processor 204 and a hard-drive and/or flash memory may be utilized to store recorded image data and depth data. The processor 204 may comprise suitable logic, circuitry, interfaces, and/or code that may be operable to coordinate operation of the various components of the camera 102. The processor 204 may, for example, run an operating system of the camera 102 and control communication of information and signals between components of the camera 102. The processor 204 may execute instructions stored in the memory 202. The DSP 206 may comprise suitable logic, circuitry, interfaces, and/or code that may be operable to perform complex processing of captured image data, captured depth data, and captured audio data. The DSP 206 may be operable to, for example, compress and/or decompress the data, encode and/or decode the data, and/or filter the data to remove noise and/or otherwise improve perceived audio and/or video quality for a listener and/or viewer.

The error protection module 208 may comprise suitable logic, circuitry, interfaces and/or code that may be operable to perform error protection functions for the monoscopic camera 102. For example, the error protection module 208 may provide error protection to encoded 2D video images and corresponding depth information, and/or encoded audio data for transmission to a video rendering device that may be communicatively coupled to the monoscopic camera 102.

The video encoder/decoder 210 may comprise suitable logic, circuitry, interfaces, and/or code that may be operable to process captured color, brightness, and/or depth data to make the data suitable for conveyance to, for example, the display 230 and/or to one or more external devices via the I/O block 228. For example, the video encoder/decoder 210 may convert between, for example, raw RGB or YCrCb pixel values and an MPEG encoding. Although depicted as a separate block, the video encoder/decoder 210 may be implemented in the DSP 206.

The audio encoder/decoder 212 may comprise suitable logic, circuitry, interfaces, and/or code that may be operable to process captured color, brightness, and/or depth data to make the data suitable for conveyance to, for example, the speaker 214 and/or to one or more external devices via the I/O block 228. For example, the video encoder/decoder 210 may convert between, for example, raw pulse-code-modulated audio and an MP3 or AAC encoding. Although depicted as a separate block, the audio encoder/decoder 212 may be implemented in the DSP 206.

The speaker 214 may comprise suitable logic, circuitry, interfaces, and/or code operable to convert electrical signals into acoustic waves. The microphone 216 may be operable to amplify, equalize, and/or otherwise generate audio signals based on audio information generated in the camera 102. The directionality of the speaker 214 may be controlled electronically and/or mechanically.

The microphone 216 may comprise a transducer and associated logic, circuitry, interfaces, and/or code operable to convert acoustic waves into electrical signals. The microphone 216 may be operable to amplify, equalize, and/or otherwise process captured audio signals. The directionality of the microphone 216 may be controlled electronically and/or mechanically.

The optics module 218 may comprise various optical devices for conditioning and directing EM waves received via the lens 101c. The optics module 218 may direct EM waves in the visible spectrum to the image sensor 222 and direct EM waves in the infrared spectrum to the depth sensor 226. The optics module 218 may comprise, for example, one or more lenses, prisms, color filters, and/or mirrors.

Each image sensor 222 may each comprise suitable logic, circuitry, interfaces, and/or code that may be operable to convert optical signals to electrical signals. Each image sensor 222 may comprise, for example, a charge coupled device (CCD) images sensor or a complimentary metal oxide semiconductor (CMOS) image sensor. Each image sensor 222 may capture 2D brightness and/or color information.

Each color sensor 224 may comprise suitable logic, circuitry, interfaces, and/or code that may be operable to detect color generation and/or generate color related information based thereon in images captures via the camera 102.

Each depth sensor 226 may comprise suitable logic, circuitry, interfaces, and/or code that may be operable to detect EM waves in the infrared spectrum and determine distance to objects based on reflected infrared waves. In an embodiment of the invention, distance may be determined based on time-of-flight of infrared waves transmitted by the emitter 220 and reflected back to the color sensor 224. In an embodiment of the invention, depth may be determined based on distortion of a captured grid.

The input/output module 228 may comprise suitable logic, circuitry, interfaces, and/or code that may enable the camera 102 to interface with other devices in accordance with one or more standards such as USB, PCI-X, IEEE 1394, HDMI, DisplayPort, and/or analog audio and/or analog video standards. For example, the I/O module 228 may be operable to send and receive signals from the controls 232, output video to the display 230, output audio to the speaker 214, handle audio input from the microphone 216, read from and write to cassettes, flash cards, hard disk drives, solid state drives, or other external memory attached to the camera 102, and/or output audio and/or video via one or more ports such as a IEEE 1394 or USB port.

The digital display 230 may comprise suitable logic, circuitry, interfaces, and/or code that may enable displaying video and/or images, captured, generated, and/or processed via the monoscopic camera 102. In this regard, the digital display 230 may comprise, for example, an LCD, LED, OLED, or other digital display technology on which images recorded via the camera 102 may be displayed. In an embodiment of the invention, the digital display 230 may be operable to display 3D images. The controls 232 may comprise suitable logic, circuitry, interfaces, and/or code. The controls 232 may enable a user to interact with the camera 102. For example, controls for controlling recording and playback. In an embodiment of the invention, the controls 232 may enable a user to select whether the camera 102 records and/or outputs video in 2D or 3D modes. The optical viewfinder 234 may enable a user to see what the lens 101c "sees," that is, what is "in frame."

In an exemplary aspect of the invention, the camera 102 may comprise an image sensor pipeline (ISP) 250. In this regard, the ISP 250 may be implemented as a dedicated component, and/or as part of another component of the camera 102, such as the processor 202 for example. The ISP 250 may comprise suitable circuitry, logic and/or code that may be operable to process imaging (or video) data, which may be received from one or more imaging related sensors, such as image sensors 222, sensor 224, and/or depth sensor 226. In this regard, the ISP 250 may perform and/or support various video processing operations and/or techniques comprising, for example, filtering, demosaic, lens shading correction, defective pixel correction, white balance, image compensation, Bayer interpolation, color transformation, and/or post filtering. The ISP 250 may provide accelerated processing of imaging data. In this regard, the accelerated processing may be achieved by use of pipelined based architecture, with the ISP 250 comprising programmable pipeline structure for example. The ISP 250 may comprise, for example, multiple sensor processing stages, implemented in hardware, software, firmware, and/or any combination thereof. Exemplary processing stages may comprise demosaicing, geometric distortion correction, color conversion, denoising, and/or sharpening, for example. Furthermore, processing of image data may be performed on variable sized tiles, reducing the memory requirements of the ISP 250 processes.

In operation, the camera 102 may be utilized to generate 3D video and/or images based on captured 2D video data and corresponding depth information. For example, the depth sensor(s) 226 may capture depth information and the image sensor(s) 222 may capture 2D image information. Similarly, for a lower-end application of the camera 102, such as a security camera, the image sensor(s) 222 may capture only brightness information for rendering black and white 3D video. The depth information may, for example, be stored and/or communicated as metadata and/or an additional layer of information associated with 2D image information. In this regard, a data structure in which the 2D image information is stored may comprise one or more fields and/or indications that indicate depth data associated with the stored 2D image information is available for rendering a 3D image. Similarly, packets in which the 2D image information is communicated may comprise one or more fields and/or indications that indicate depth data associated with the communicated 2D image information is available for rendering a 3D image. Thus, for outputting 2D video, the camera 101 may read the 2D image information out of memory, and process it to generate a 2D video stream to the display and/or the I/O block. For outputting 3D video, may: (1) read the 2D image information from memory; (2) determine, based on an indication stored in memory with the 2D image information, that associated depth information is available; (3) read the depth information from memory; and (4) process the 2D image information and depth information to generate a 3D video stream.

Processing of the 2D image information and depth information may comprise synchronizing the depth information to the 2D image information. Processing of the 2D image information and depth information may comprise scaling and/or interpolating either or both of the 2D image information and the associated depth information. For example, the resolution of the depth sensor 226 may be less than the resolution of the image sensor 222. Accordingly, the camera 102 may be operable to interpolate between pixels of depth information to generate depth information for each pixel, or group of pixels, of 2D image information. Similarly, the frame rate of the depth sensor 226 may be less than the frame rate of the image sensor 222. Accordingly, the camera 102 may be operable to interpolate between frames of depth information to generate a frame of depth information for each frame of 2D image information.

In various embodiments on the invention, the monoscopic camera 102 may be operable to capture 2D video, such as via the image sensor(s) 222, which may also capture associated color information via the color sensor(s) 224, and may also capture depth information, such as via the depth sensor(s) 226 for example. The monoscopic camera 102 may then adaptively process video information associated captured images, to enhance these images. In this regard, the monoscopic camera 102 may utilize the captured depth information for adaptively scaling 3D video and/or images generated from the captured 2D video and/or images, by configuring and/or adjusting scaling of portions and/or regions of the 2D video and/or images based on corresponding depth information for example. In an embodiment of the invention, depth information captured via the depth sensor 226 may be utilized to determine and/or estimate presence of different depth levels in 2D images or video, which may be captured via the image sensor 222. Consequently, scaling operations may be performed and/or configured adaptively, such that scaling may be applied selectively and/or variably to different portions and/or regions of the 2D video and/or image, based on depth level, as determined from the depth information, associated with these different portions and/or regions.

Figure 2B:
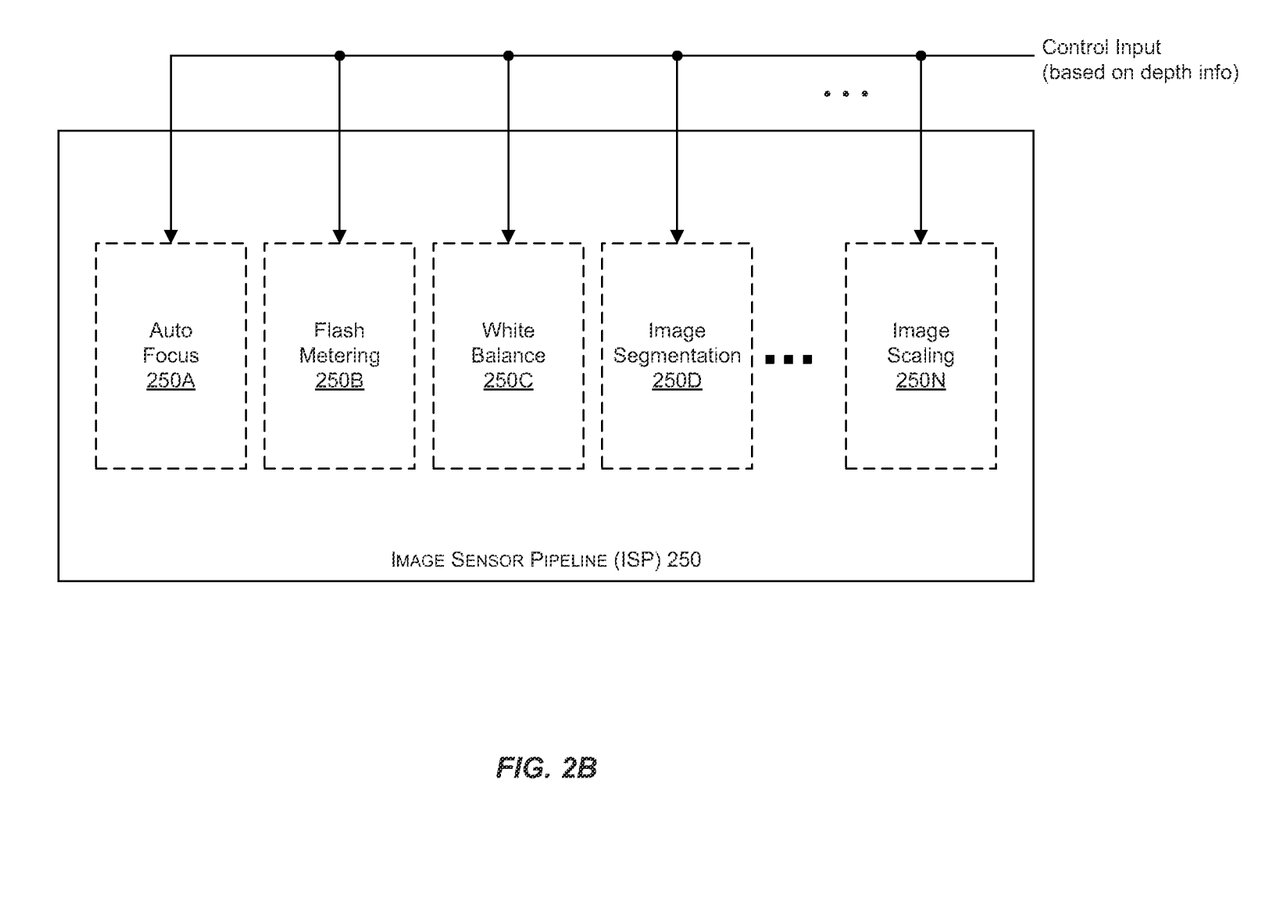
FIG. 2B is a block diagram illustrating an exemplary image sensor pipeline (ISP), which may be utilized in accordance with an embodiment of the invention.

FIG. 2B is a block diagram illustrating an exemplary image sensor pipeline (ISP), which may be utilized in accordance with an embodiment of the invention. Referring to FIG. 2B, there is shown the image sensor pipeline (ISP) 250 of FIG. 2A.

The ISP 250 may comprise suitable circuitry, logic and/or code that may be operable to perform various functions associated with processing of imaging data, which may be received from one or more imaging related sensors, in accelerated manner, by use of pipelined based architecture for example. The ISP 250 may be utilized to enable, for example, pipelined color processing of captured images. In this regard, the ISP 250 may be configured as programmable pipeline structure, comprising a plurality of functions $250_A$-$250_N$, each of which associated with handling and/or performing particular image processing function. Accordingly, the ISP 250 may enable accelerated image processing by splitting the processing of data associated with each particular image into stages, to enable concurrently handling multiple images with each of the plurality of functions $250_A$-$250_N$ being utilized to, for example, perform the corresponding processing function on different images. In other words, ISP 250 may enable handling multiple images since processing of each image may be at different stage at any given point. This may enable implementing various aspects of the invention by adjusting different stages of pipelined functions, without affecting the overall processing duration since some of the operations may be done while other stages are being performed. Data may be moved from any point of the ISP 250 and processed in software and the resulting software processed data may be put into any desired point of the ISP 250 for processing in hardware.

Exemplary processing functions handled and/or implemented by the ISP 250 may comprise, for example, auto-focus function $250_A$, flash-metering function $250_B$, auto-white-balance (AWB) function $250_C$, image segmentation function $250_D$, and/or image scaling function $250_N$.

The auto-focus function $250_A$ may comprise performing focusing operations automatically. In this regard, focusing may comprise selecting one or more portions of an image to be focal points during images processing, in which light from these portions and/or objects there in, are optimally captured and/or corresponding image information are consequently very accurate. Auto-focus operations may comprise use and/or or control of image sensors to enable selecting focus points, and/or to determine correct focusing associated therewith. In this regard, auto-focus may be active, in which distance to the focus points (or objects) may be determined, and subsequently correct focusing may be effectuated, by controlling and/or adjusting available image sensors, using such techniques as light metering for example. Auto-focus may also be passive, in which focus point selection and/or corresponding focusing adjustment may be performed base don passive analysis of the image, and/or associate image information after the image is captured.

The flash-metering function $250_B$ may comprise controlling flashing operations, such as of the camera 102, based on image sensory information. In this regard, flash-metering may comprise determining and/or measuring levels of light or brightness in a scene with which an image is associated, and selecting and/or controlling based thereon the amount of light emitted by a flash component coupled to and/or integrated into the camera. The light measuring may be performed using one or more sensors, and/or via the camera's lenses.

The AWB function $250_C$ may comprise performing white balance operations automatically. In this regard, white balancing may comprise adjusting color intensities of portions of an image associated with the white color, to ensure that these portions may be render correctly—i.e. with more natural feel, based on identification of the objects associated with these white areas and/or settings in which the image was captured. The white color may typically be function of equal, or near equal mixing of the three primary colors (red, green, and blue). Accordingly, during color balancing, contribution or parameters associated with each of these three colors may be adjusted to adjust the whiteness of the white color region. For example, white balancing may comprise adjusting image portions associated with snow such that the white color associated with the snow may be rendered with a degree of blueness.

The image segmentation function $250_D$ may comprise partitioning an image, whose information is processed, into multiple segments, each of comprising a plurality of contagious and/or non-contagious pixels, based on presence of one or more common characteristics among pixels in each segment. The common characteristics may be determined based on predetermined ranges associated with one or more video information, such as intensity and/or color. Image segmentation may be utilized to enable simplifying and/or changing processing image data, by configuring analysis and/or processing of image data in accordance with the common characteristics associated with each segment. Image segmentation may also be utilized to enable and/or enhance locating objects and boundaries, such as lines or curves, in images.

The image scaling function $250_N$ may comprise resizing images, and/or portions thereof, to increase or decrease the image (or portion) size. In this regard, image scaling may comprise and/or pertain to zooming operations, in which a portion of an image may be adjusted to fit larger or smaller portion of screen. Image scaling may affect various characteristics of the mages, such as smoothness and/or sharpness. In this regard, increasing the size of image may reduce the smoothness and/or sharpness in the image, while decreasing the size of image may enhance its smoothness and/or sharpness. Image scaling may comprise subsampling or upsampling an image, or portion thereof based on whether the image (or portion) is being scaled up or down.

In various embodiments of the invention, the depth information generated and/or captured via the depth sensor 226 may be utilized to enhance and/or improve image processing performed in the camera 102. In this regard, the depth information may be utilized to generate and/or adjust control information utilized in controlling and/or managing operations of the ISP 250. For example, the control information may be utilized to adjust and/or control various stages and/or functions of the ISP 250, such as the auto-focus function $250_A$, the flash-metering function $250_B$, the AWB function $250_C$, the image segmentation function $250_D$, and/or the image scaling function $250_N$. For example, the auto-focus function $250_A$ may be adjusted, based on depth information, to enable selecting focus points, and/or configuring focusing operations relating thereto, adaptively at different depths relative to the camera 102. Also, algorithms utilized during AWB operations may be adjusted to enable applying white balancing adaptively at different depths relative to the camera 102. Similarly, algorithms and/or parameters utilized scaling operations may be adjusted to enable performing scaling operations adaptively at different depths relative to the camera 102.

Operations of the ISP 250 may also be controlled and/or adjusted during adaptive scaling processing in the monoscopic camera 102. In this regard, at least some of the functions $250_A$-$260_N$ of the ISP 250 may be modified and/or configured to enable supporting and/or performing various operations associated with scaling portions of captured images. For example, the auto-focus function $250_A$ may be adjusted to focus on particular types of objects and/or to do so at particular depths, such as by incorporating depth information related parameters into this function. The image segmentation function $250_D$ may also be adjusted to enable selecting and/or grouping portions of the image associated with different depth levels. The scaling function $250_N$ may be adjusted to enable configuring a plurality of scaling control information, associated with different depth levels, and/or to applying scaling variably to these different depth levels.

Figure 3:
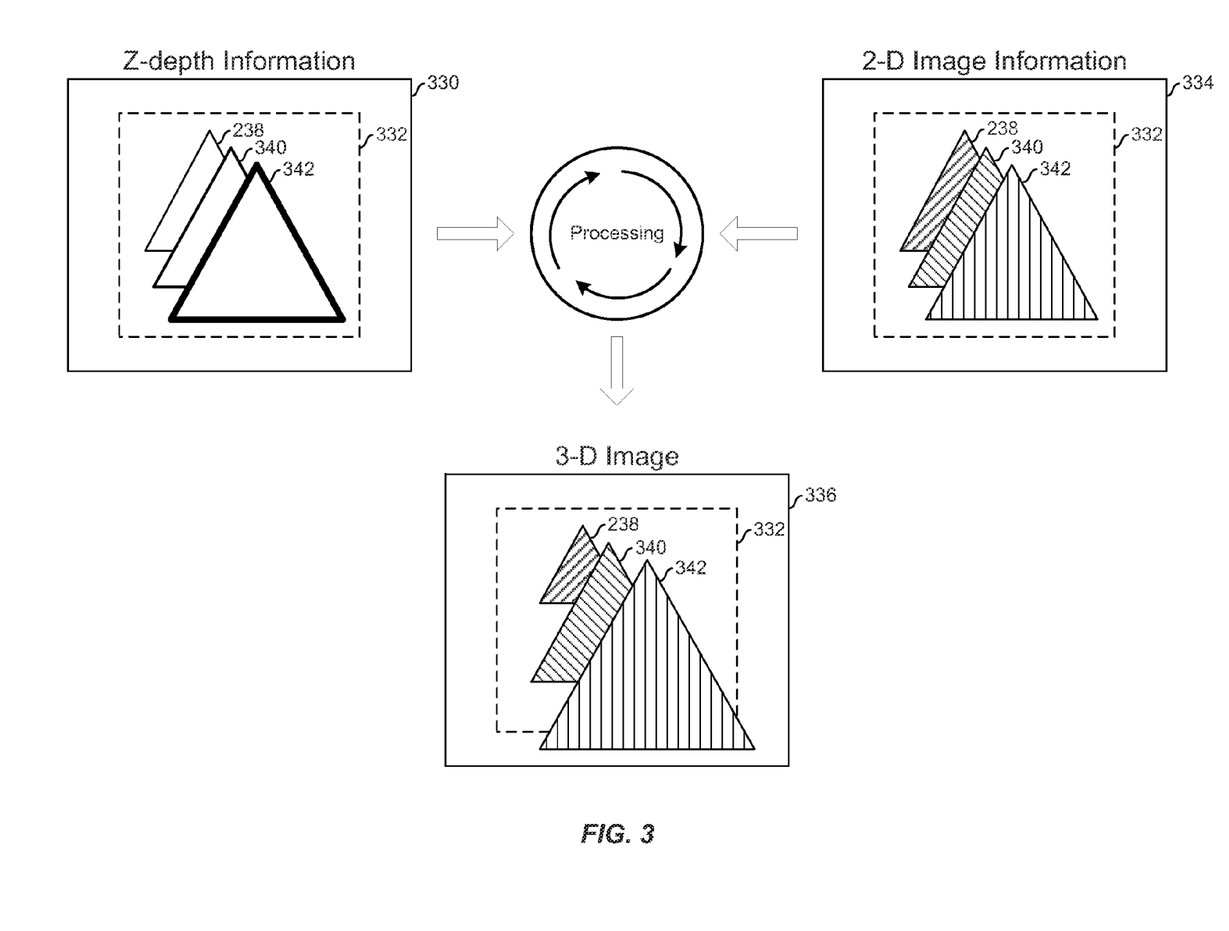
FIG. 3 is a diagram that illustrates exemplary processing of depth information and 2D image information to generate a 3D image, which may be utilized in accordance with an embodiment of the invention.

FIG. 3 illustrates processing of depth information and 2D image information to generate a 3D image, which may be utilized in accordance with an embodiment of the invention. Referring to FIG. 3, there is shown a frame 330 of depth information, which may be captured by the depth sensor(s) 226, and a frame 334 of 2D image information, captured by the image sensors 222. In this regard, the depth information 330 and the 2D image information 334 may be processed to generate a frame 336 associated with a corresponding 3D image. Also shown in FIG. 3 is plane 332, indicated by a dashed line, which is merely for illustration purposes to indicate depth on the two dimensional drawing sheets.

In the frame 330, the line weight is utilized to indicate depth—heavier lines being closer to the viewer. Thus, the object 338 is farthest from the camera 102, the object 342 is closest to the camera 102 and the object 104 is at an intermediate distance.

In operation, depth information, such as in frame 330 for example, may be utilized to provide depth related adjustments to corresponding 2D video information, such as in frame 334 for example. For example, the depth information may be mapped to a grayscale, or pseudo-grayscale, image for display to the viewer. Such mapping may be performed by the DSP 206 for example. The image associated with the frame 334 may be a conventional 2D image. A viewer of the frame 234, for example on the display 120 or on a dedicated display device connected to the camera 102 via the I/O module 228, may perceive the same distance to each of the objects 338, 340, and 342. That is, each of the objects 338, 340, and 342 each appear to reside on the plane 332.

Accordingly, 2D video information and corresponding depth information may be processed to enable generating 3D images, associated with frame 336 for example, which may provide depth perception when viewed. For example, the depth information of frame 330 may be utilized to adaptively adjust video information with each of objects in the 2D images of frames 334 to create perception of different depths for objects contained therein. In this regard, the viewer of frames 336, on the display 120 or on a dedicated display device connected to the camera 102 via the I/O module 228 for example, may perceive the object 338 being furthest from the viewer the object 342 being closest to the viewer, and the object 340 being at an intermediate distance. In this regard, the object 338 may appear to be behind the reference plane, the object 340 may appear to be on the reference plane, and the object 342 may appear to be in front of the reference plane.

In various embodiments on the invention, depth information may be utilized to enable adaptively scaling images. In this regard, adaptive scaling may comprise separately and/or adaptively scaling different portions of images. In this regard, the different portions may be associated with different depths relative to the camera 102. For example, depth information, such as in frame 330 for example, may be utilized for determining presence different depth levels, which corresponds to the depth of each of the objects 338, 340, and 342 for example. Accordingly, the different depth levels may be subjected to variable scaling. In this regard, scaling operations may be configured such that it may apply to depth level associated with a focal point, with scaling applied to other portions of the image being adjusted to maintained relative depth separation between these portions and the focal portion of the image. Configuration of scaling operations may be performed in response to, for example, user input, which may comprise zoom commands. In this regard, scaling operations may be configured to focus on one or more of the different portions of the two-dimensional video, and/or one or more of the determined plurality of depth planes, based on zoom commands.

Figure 4:
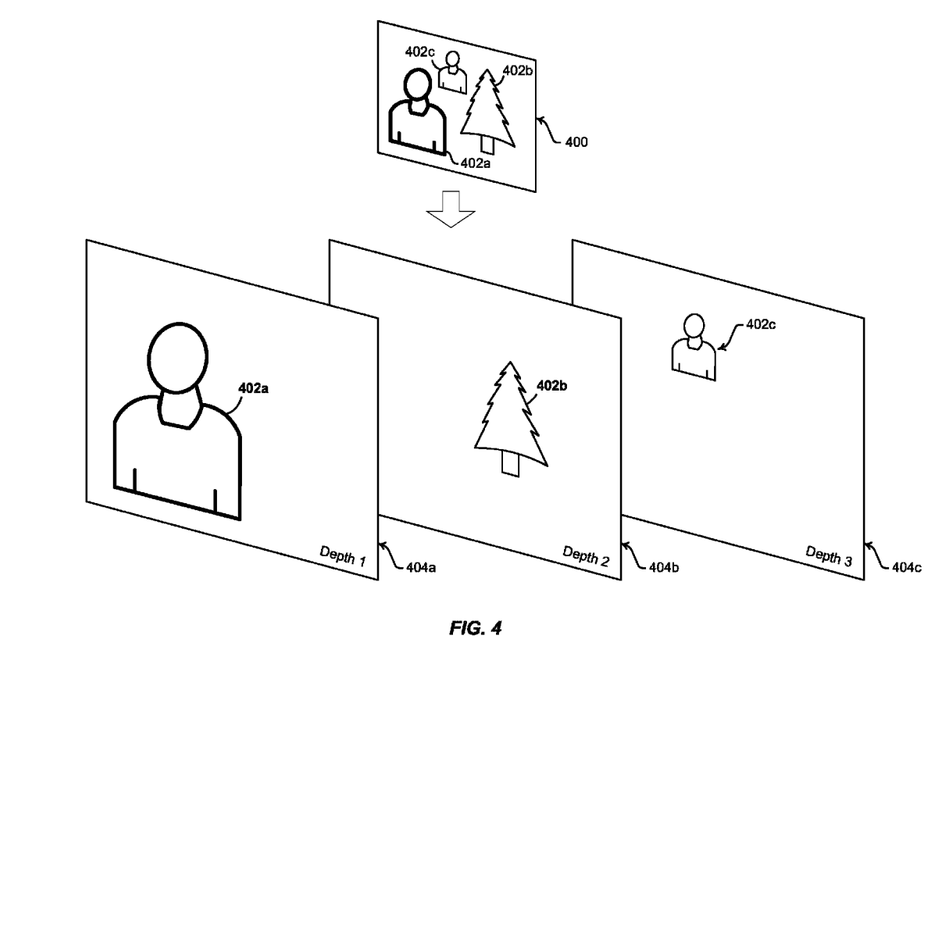
FIG. 4 is a diagram that illustrates exemplary scaling processing via monoscopic camera based on Z-depth information, which may be utilized in accordance with an embodiment of the invention.

FIG. 4 is a diagram that illustrates exemplary scaling processing via monoscopic camera based on Z-depth information, which may be utilized in accordance with an embodiment of the invention. Referring to FIG. 4, there is shown an image frame 400 which may be captured and/or processed via the monoscopic camera 102 for example.

The image frame 400 may comprise video information corresponding to a captured image. The captured image may comprise a plurality of objects, of which objects 402a, 402b, and 402c are shown. In this regard, objects 402a, 402b, and 402c may be located at difference depths relative to a reference point, which may correspond to, for example, location of the monoscopic camera 102 at the time when the image is captured and/or the image frame 400 is generated.

In operation, the monoscopic camera 102 may utilize depth information captured and/or generated at the time the image frame 400 is generated to create 3D image perception, substantially as described with respect to FIGS. 2A and 3. Furthermore, the monoscopic camera 102 may adaptively process and/or handle video information associated with captured images, to enhance the captured images and/or rendering thereof. This may comprise, for example, performing adaptive scaling operations. In this regard, the monoscopic camera 102 may adaptively configure scaling operations applicable to captured two-dimensional video based on corresponding captured depth information. The scaling operations, and/or adaptive configuration thereof may be performed in response to, for example, user input, which may comprise zoom commands. In this regard, scaling operations may be configured to focus on one or more of the different portions of the two-dimensional video, and/or one or more of the determined plurality of depth planes, based on zoom commands.

For example, the monoscopic camera 102 may be operable to variably scale different portions of the two-dimensional video based on the captured depth information. In this regard, the monoscopic camera 102 may determine, based on the depth information, a plurality of depth planes associated with the different portions in the video frame 400. For example, the monoscopic camera 102 may determine based on depth information, different depth planes associated with each of the objects 402a, 402b, and 402c, as shown in FIG. 4. Accordingly, scaling of each of the objects 402a, 402b, and 402c may be performed separately and/or adaptively based on the corresponding determined depth planes. In this regard, the scaling operations may be configured such that scaling may first be may applied to a depth plane associated with a focal point. Scaling of remaining portions of the image may then be adjusted to maintain relative depth separation between these portions and the focal portion of the image. For example, in instances where the scaling is being performed to zoom on certain portion, such as depth level 2, the monoscopic camera 102 may determine the proper scaling applicable to portions of image frame 400 that may be required to achieve the required zooming. For example, for x2 zooming, scaling operations applicable to object 402b may be performed such that the object 402b may be doubled in size. Scaling of remaining portions of the image frame 400, such as portions associated with depth levels 1 and 3, may be applied adjusted to account for having depth levels that are closer or further relative to the focal portion. For example, with x2 zooming, objects at shallower depth planes, such as depth plane 1, may be scaled to be more than double the original size, whereas objects at deeper depth planes, such as depth plane 3, may be scaled by only to be less than double the original size.

Figure 5:
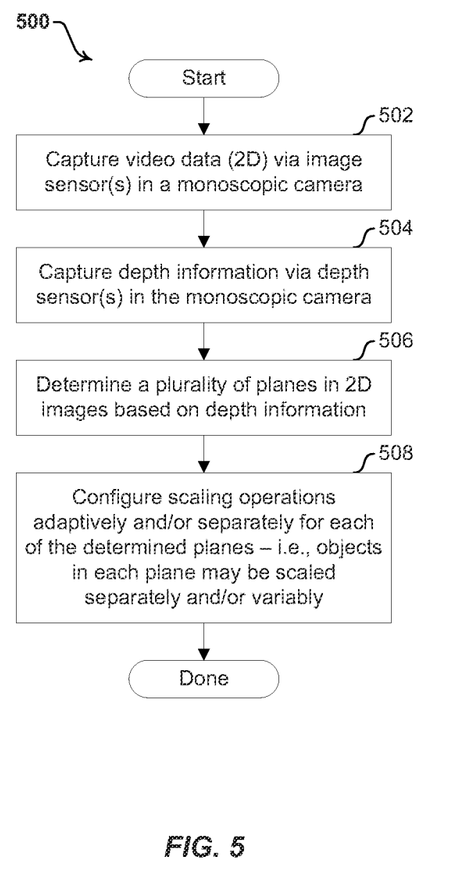
FIG. 5 is a flow chart that illustrates exemplary steps for utilizing image sensor pipeline (ISP) for scaling 3D images based on z-depth information, in accordance with an embodiment of the invention.

FIG. 5 is a flow chart that illustrates exemplary steps for utilizing image sensor pipeline (ISP) for scaling 3D images based on z-depth information, in accordance with an embodiment of the invention. Referring to FIG. 5, there is shown a flow chart 500 comprising a plurality of exemplary steps that may be performed to enable performing utilizing image sensor pipeline (ISP) for scaling 3D images based on z-depth information during video processing.

In step 502, capture video data (2D) via image sensor(s) in a monoscopic camera. In step 504, capture depth information via depth sensor(s) in the monoscopic camera. In step 506, determine a plurality of planes in 2D images based on captured depth information. In step 508, configure scaling operations adaptively and/or separately for each of the determined planes—that is, objects in each plane may be scaled separately and/or variably.

Various embodiments of the invention may comprise a method and system for utilizing image sensor pipeline (ISP) for scaling 3D images based on z-depth information. The monoscopic video camera 102 may be operable to adaptively scale video information associated with various portions of captured images, based on determined corresponding depths for these portions. In this regard, the monoscopic video camera 102 may capture, via image sensors 222 and/or color sensors 224, two-dimensional video, and may capture, via depth sensor 226, corresponding depth information for the captured two-dimensional video. The monoscopic video camera may then determine a plurality of depth planes corresponding to the two-dimensional video based on the captured depth information. Scaling processing of image related information corresponding to various objects and/or portions in the captured two-dimensional video may be adaptively configured based on association between these objects and/or the portions and ate least one of the plurality of depth planes. In this regard, adaptive configuration of scaling processing may comprise adjusting and/or controlling one or more functions $250_A$-$250_N$ in the ISP 250. Configuration of scaling operations may be performed in response to user input. Exemplary user input may comprise zoom commands. In this regard, scaling operations may be configured such that to focus on one or more different portions of the two-dimensional video based on the zoom commands. Configuring image processing of objects image related information may be performed based on preset criteria and/or parameters associated with identified types and/or characteristics of the objects. The monoscopic video camera 102 may be operable to synchronize the captured corresponding depth information to the captured two-dimensional video, to enable generating 3D perception for at least some images captured via the monoscopic video camera 102.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for utilizing image sensor pipeline (ISP) for scaling 3D images based on z-depth information.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method, comprising:
capturing via at least one image sensor of a monoscopic video camera, a two-dimensional video;
capturing via at least one depth sensor of said monoscopic video camera, corresponding depth information for said captured two-dimensional video; and
focusing on a portion among a plurality of portions of said two-dimensional video, wherein focusing comprises selecting said portion as a focal point for processing said two-dimensional video; and
scaling said two-dimensional video in response to a user-zoom, wherein scaling comprises resizing said portions of said two-dimensional video variably by:
scaling said focused portion at a focal depth plane using a first scale factor, the first factor generated based on said user-zoom: and
scaling another portion among said plurality of portions at another depth plane using a second scale factor, the second scale factor generated to be proportional to said first scale factor based on a relation between said focal depth plane and said another depth plane.

2. The method according to claim 1, wherein, said variable scaling comprises adjusting and/or controlling one or more functions in an image sensor pipeline (ISP) utilized during image processing in said monoscopic video camera.

3. The method according to claim 1, comprising:
determining a plurality of depth planes in said depth information; and
determining said plurality of portions of said two-dimensional video that are subjected to variable scaling based on said determined plurality of depth planes.

4. The method according to claim 1, wherein said user-zoom comprises a user-input zoom factor.

5. The method according to claim 1, comprising synchronizing said captured corresponding depth information to said captured two-dimensional video.

6. The method according to claim 1, comprising:
composing three-dimensional video from said captured two-dimensional video based on said captured corresponding depth information; and
rendering said composed three-dimensional video via a display that is communicatively coupled to said monoscopic video camera.

7. A system, comprising:
one or more circuits for use in a monoscopic video camera that comprises at least one image sensor and at least one depth sensor, said one or more circuits being operable to:
capture via said at least one image sensor of the monoscopic video camera, a two-dimensional video;
capture via said at least one depth sensor of said monoscopic video camera, corresponding depth information for said captured two-dimensional video;
select a focal portion of said captured two-dimensional video;
identify a focal depth of said selected focal portion in said captured depth information; and
scale said two-dimensional video adaptively in response to a user-input zoom-factor and based on said depth information, said adaptive scaling comprising:
scaling said focal portion of said two-dimensional video with a first scale-factor, wherein said first scale-factor is calculated based on said zoom-factor; and
scaling a second portion of said two-dimensional video with a second scale-factor, wherein said second scale-factor is calculated based on said zoom-factor and proportion of depth of said second portion to said focal depth.

8. The system according to claim 7, wherein said one or more circuits comprise an image sensor pipeline (ISP), and said one or more circuits are operable to perform said adaptive scaling by adjusting and/or controlling one or more functions in said image sensor pipeline (ISP) utilized during image processing in said monoscopic video camera.

9. The system according to claim 7, wherein said one or more circuits are operable to determine a plurality of depth planes corresponding to said two-dimensional video based on said depth information.

10. The system according to claim 7, wherein in response to said user input, said one or more circuits are operable to select a third portion of said two-dimensional video as said focal plane.

11. The system according to claim 7, wherein said one or more circuits are operable to synchronize said captured corresponding depth information to said captured two-dimensional video.

12. The system according to claim 7, wherein said one or more circuits are operable to compose three-dimensional video from said captured two-dimensional video based on said captured corresponding depth information.

13. The system according to claim 12, wherein said one or more circuits are operable to render said composed three-dimensional video via a display that is communicatively coupled to said monoscopic video camera.

14. A device comprising:
an image sensor configured to capture a two-dimensional image;
a depth sensor configured to capture depth information corresponding to the captured two-dimensional image;
a processor further configured to operate the image sensor to select a portion of the two-dimensional image as a focal portion, wherein light from the focal portion is captured optimally;
the processor further operable to determine a focal depth of the focal portion from the captured depth information;
a control configured to receive a zoom command;
the processor configured to calculate a zoom-factor in response to the zoom command;
the processor further configured to calculate, in response to the zoom command, a first scale-factor to be applied to portions of the two-dimensional image at the focal depth, the scale-factor based on the zoom-factor and the focal depth;
the processor further configured to scale the portions in the two-dimensional image at the focal depth using the calculated first scale-factor in response to the zoom command;
the processor further configured to calculate a second scale-factor for a second portion in the two-dimensional image at a different depth than the focal depth, the second scale-factor based on the zoom-factor and a proportion of the focal depth and the depth of the second portion; and
the processor further configured to scale the second portion in the captured two-dimensional image using the second scale-factor.

15. The device of claim 14, wherein the processor is further configured to:
operate the the image sensor to select another portion of the two-dimensional image as the focal portion in response to the zoom.

* * * * *

UNITED STATES PATENT AND TRADEMARK OFFICE
CERTIFICATE OF CORRECTION

PATENT NO.       : 9,013,552 B2                                   Page 1 of 1
APPLICATION NO.  : 13/174261
DATED            : April 21, 2015
INVENTOR(S)      : Chris Boross et al.

It is certified that error appears in the above-identified patent and that said Letters Patent is hereby corrected as shown below:

In the Claims

Column 13, Claim 1, Line 66, before "factor generated" insert --scale--.

Signed and Sealed this
Eighth Day of September, 2015

Michelle K. Lee
*Director of the United States Patent and Trademark Office*